Nov. 12, 1968   G. W. MOOG   3,410,044
FOAMED PLASTIC BASED CONSTRUCTION ELEMENTS
Filed July 23, 1965   3 Sheets-Sheet 2

INVENTOR.
GERHARD W. MOOG
BY Douglas S. Johnson
Attorney

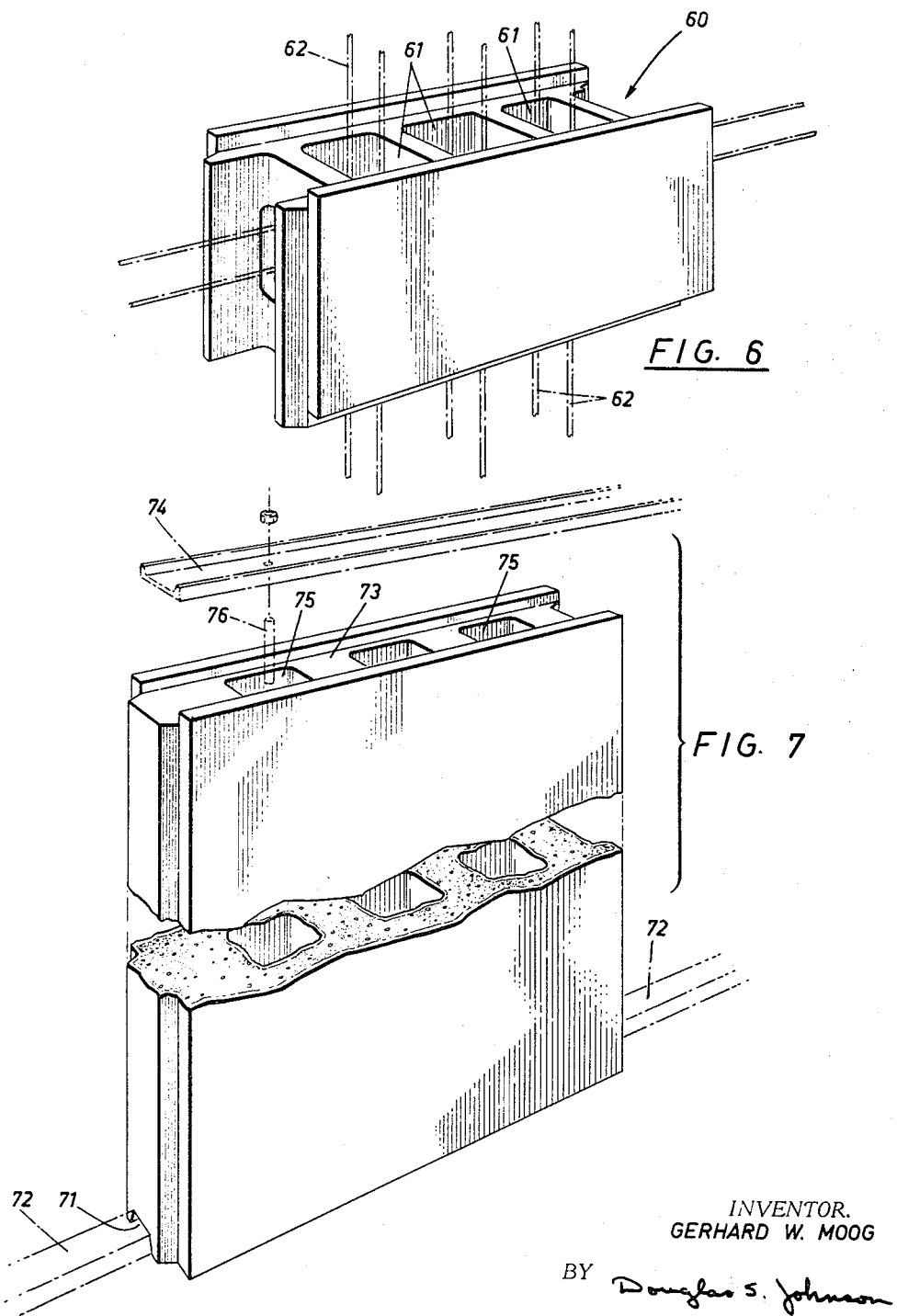

United States Patent Office 3,410,044
Patented Nov. 12, 1968

3,410,044
FOAMED PLASTIC BASED CONSTRUCTION ELEMENTS
Gerhard Willy Moog, Toronto, Ontario, Canada, assignor to Contemporary Walls Limited, Toronto, Ontario, Canada
Filed July 23, 1965, Ser. No. 474,525
7 Claims. (Cl. 52—309)

ABSTRACT OF THE DISCLOSURE

A wall construction comprising a plurality of molded construction elements, each of which elements is of a foamable plastic and comprises a low density core and a hard, integrally formed smooth, higher density skin; and wherein each of the construction elements has an orifice molded therein, the skin completely encases the foamed core and forms a lining of the orifice, and concrete fills the orifice.

---

This invention relates to novel construction elements and more particularly to blocks for use by the construction industry such as building blocks and concrete forming blocks.

In the construction industry various types of buildings are made ranging from simple single story dwellings to large multi-story apartments, office buildings, factories, etc. A variety of construction methods are employed to build such buildings; such methods as wood framing, steel framing, poured and stressed concrete being the most usual. Another method of construction which is used particularly for small and simple buildings employs the use of concrete or cinder blocks laid in courses, one on the other, to form walls. Oftentimes, the concrete or cinder blocks are then faced with brick veneer, aluminum siding or other suitable material.

The present invention contemplates the use of novel construction elements for use either as building blocks in the construction of walls or as concrete forming blocks. The construction elements of the invention are of such a nature that insulation (both against temperature differentials and sounds) and wall finish are included in the elements.

The construction elements of the present invention are made of foamable plastic material based polymer systems from which the novel forms of the present invention can be moulded and which systems are well known in the art. Of the materials, including all the known blowing agents which are used therewith, those that are particularly contemplated for use as constituent elements in the present invention are those foamable plastic based polymer systems which are based on urethane, phenolic, styrene and epoxy polymers and prepolymers. Urethane and styrene based foaming formulations are preferred. In addition, each of the constituent material systems is prepared and moulded in such a manner that a hard integrally formed smooth skin is moulded with and is an integral part of the various forms of construction elements contemplated by this invention.

The normal weight of the foaming formulation used is the amount thereof required to produce approximately two and one half to ten times the formulation weight normally required to form a foamed mass having a density of approximately two to four pounds per cubic foot. By using such additional weight of the foamable formulation when charging a mould to form any of the novel elements contemplated by this invention, the hard, smooth skin is formed as an integral part of the element. The skin so produced is smooth, non-porous, and relatively vapour impermeable and has a relatively uniform depth. This depth normally varies from approximately 1/64 to approximately 1/4 inch. The density of the form centre will vary from approximately two to four pounds per cubic foot, and the density of the integrally formed skin will vary from approximately ten to sixty pounds per cubic foot. The compressive yield strength of the construction element made of any of the material systems suitable for the present invention will vary from 100 to 450 p.s.i.

A construction block or concrete forming block of the present invention will thus have extremely light weight in comparison with, say, concrete or cinder blocks previously known in the construction art. Thus, the construction elements of this invention may be produced in much larger sizes than previously known, as well as in normal sizes, without undue weight. Thus, when buildings are being constructed of the present construction elements, and when large size elements are being used, labour costs may be greatly reduced, due to a decrease in weight of elements being moved and an increase in building time. Accordingly, the rate at which wall structures may be built is substantially increased and considerable savings in the construction cost of buildings may be realized.

In addition, since the construction elements of the present invention comprise a hard, smooth skin, the skin itself may be utilized to provide the finish appearance of a wall. Since various dyes and colouring materials may be readily added to the foamable base before charging a mould, a building constructed using the present construction elements may be of any desired colour or colours, limited only by the client's or architect's imaginations.

Further, because the interior of any of the construction elements contemplated by this invention is of low density (two to four pounds per cubic foot) quite adequate noise and temperature insulation may be realized. Thus, it may be possible to use the present construction elements to build a wall unit having the required strength for use as a bearing wall, and having desired finish and colour, and further having the desired insulation properties.

In addition, various designs such as architectural designs, escutcheons, logotypes, and other insignia may be moulded into any face of the construction element.

One particular form of the present invention contemplates a concrete forming block. Such a block is of particularly useful purpose in the construction of multiple-story buildings and provides for a construction element having openings therethrough into which concrete may be poured or otherwise placed. The use of such a concrete forming block thereby provides a wall having a concrete core. The construction elements of the present invention may be so molded as to have an interlocking relationship with other similar blocks or elements with which they are used, and correspondence between any orifices which may be formed in the blocks.

Previously, however, when concrete has been used in the construction industry to provide rigidity or strength, such concrete has either been precast or poured in forms which are later removed when the concrete has set. By using the concrete forming block of the present invention, a wall having such properties as finish, colour, insulation, etc., as enumerated above, and having further a concrete core for additional rigidity and strength, may be easily, quickly, and economically prepared.

The construction elements of the present invention are discussed further with particular reference to the drawings, in which:

FIG. 1 illustrates a portion of a wall structure made with the construction elements according to one embodiment of the present invention, and illustrates a form of corner block also contemplated by the present invention;

FIGS. 2, 3, and 4 illustrate the top, side and end views respectively of one embodiment of the construction elements of the present invention;

FIG. 6 illustrates another embodiment of the construction elements of the present invention; and FIG. 7 illustrates a still further embodiment of the construction elements of the present invention.

While the drawings illustrate various embodiments in which the construction elements of the present invention may be made, they are intended by way of example only, and are not intended as a limitation thereon.

Figure 1:
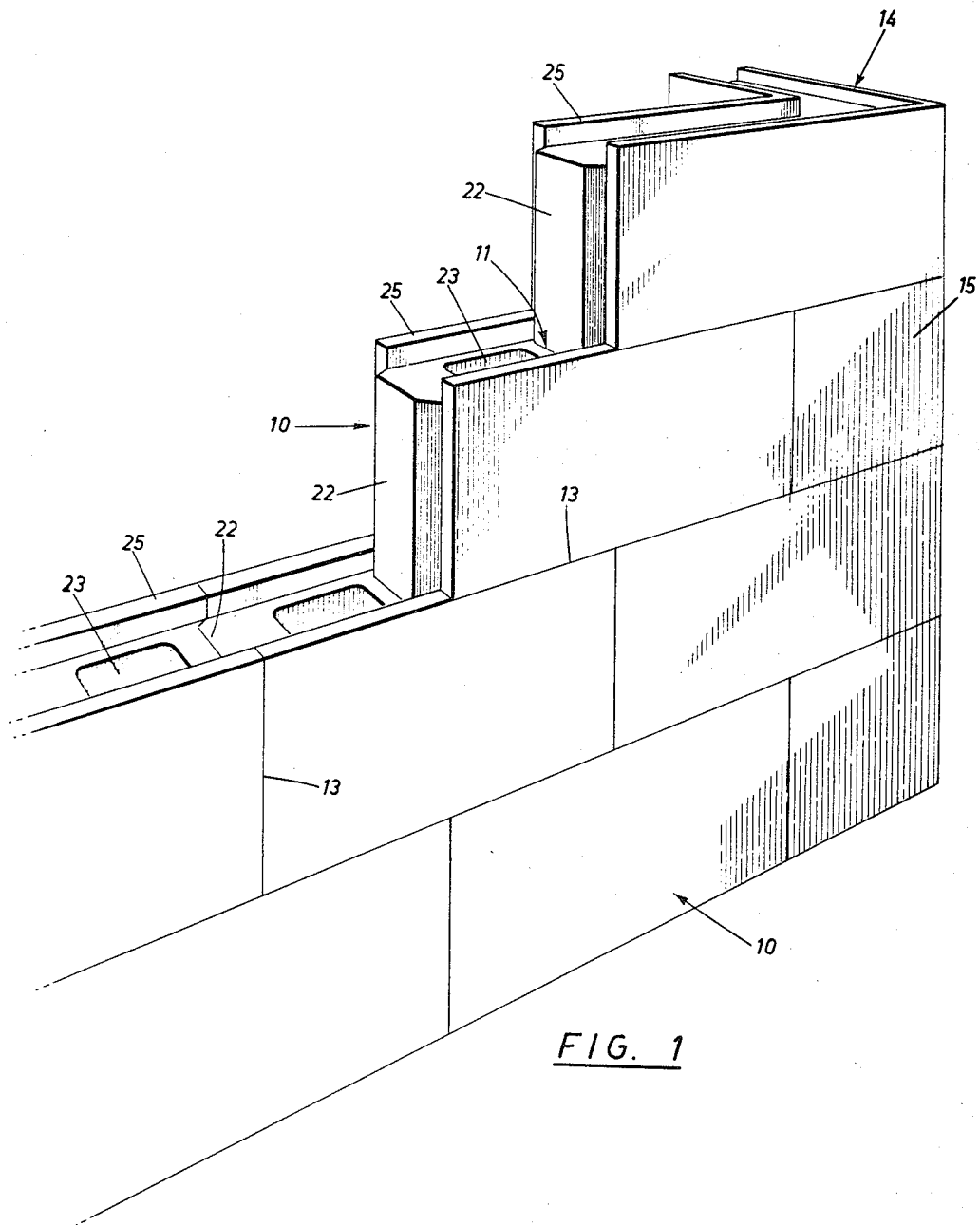

FIG. 1 illustrates a wall structure, several courses of which are shown, made using building blocks 10 contemplated by the present invention. In the particular wall structure shown, the building blocks are so moulded that they are keyed both horizontally and vertically in each of the adjacent blocks as shown generally at 11. The blocks shown in the figure have, in this instance, several holes or orifices extending vertically through the centres thereof, the purpose of which will be discussed later. The seams between the blocks, such as at 13, may be made in various ways. One particularly suitable way is to join the blocks one to another with the use of adhesive bonding, such as epoxy resins. Other ways in which the blocks may be joined together are discussed hereafter.

Figure 2:
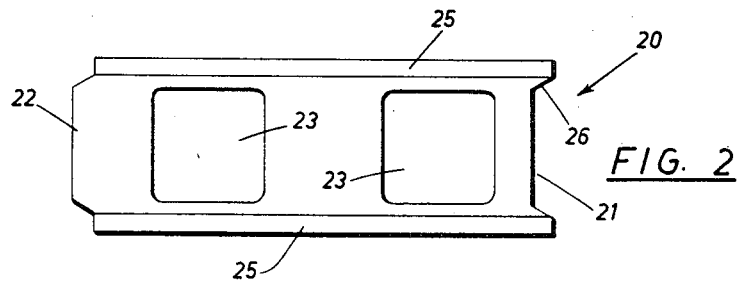

Corner blocks 14 and 15 are shown in FIG. 1; in the particular corner block shown, corner block 14 has a long leg extending to the left as viewed in the figure, and a short leg extending in the abutting wall. In corner block 15, the short and long legs are in the reverse positions, thereby achieving the staggered wall construction as illustrated. Of course, it is understood that for other types of wall structure utilizing construction elements of the present invention, any corner blocks that may be used could have equal legs; or they might have keying means as discussed more particularly with reference to FIGURES 2, 3, and 4 in the back face thereof. In any event, the corner block will have the two faces which are intended to be placed to the outside of the wall structure which are substantially planar and which intersect to form a definite corner structure.

FIGS. 2, 3, 4, and 5 illustrate one particular embodiment of a building block according to the present invention, which block is similar to that shown in FIG. 1. The block is indicated generally at 20. Two orifices 23 are shown extending vertically through the block, the purpose of which will be discussed hereinafter. As viewed in FIG. 2, the left end of block 20 is extended at 22 and the right end of the block is recessed at 21. The purpose of the extension 22 and the recession 21 is to provide a manner of keying the blocks one to another when used generally as indicated in FIG. 1. Further, the blocks have additional extensions and recessions 24 and 25, on the top and bottom thereof. It is understood that the particular face in which any extension or recession is shown is not in itself important, but only that such keying means may be included in the general configuration of the block. In the particular embodiment shown, the sloping or chamfered face of the recession 21 is shown generally at 26.

Figures 3, 4:
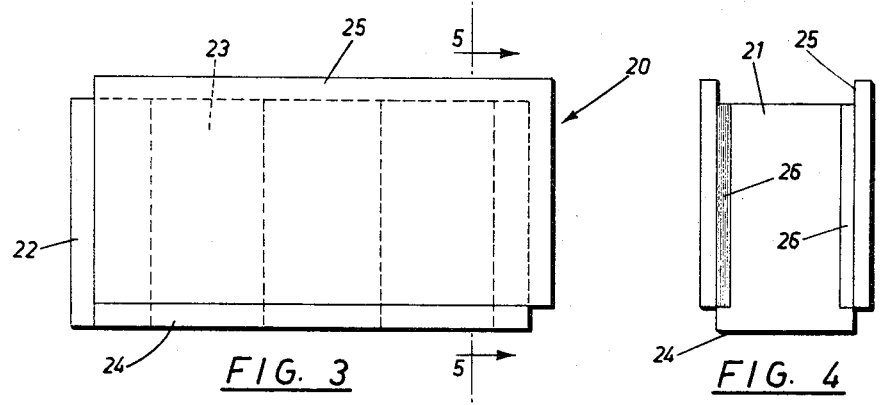
Figure 5:
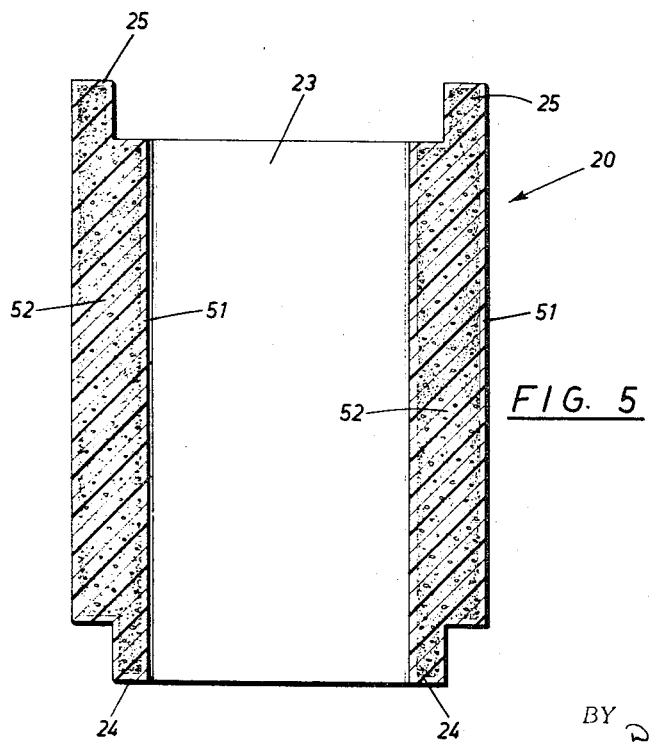
FIG. 5 is a cross-sectional view drawn to a larger scale along section 5—5 in FIG. 3.

In FIG. 5, which is a cross-sectional view of block 20 along sections 5—5 of FIG. 3, the particular cross-sectional appearance of the block is shown. It is understood that each of the construction elements contemplated by the present invention has generally the same form insofar as the core and skin thereof are concerned. The hard, integrally formed, smooth skin 51 is, as stated before, moulded as an integral part of the block. The low density, foamed core 52 is therefore completely encased by the skin 51. The depth of skin 51, as previously stated, is generally from 1/64 to approximately 1/4 inch; and the density is from approximately 10 to 60 pounds per cubic foot. The density of core 52 is approximately 2 to 4 pounds per cubic foot. Thus, it will be realized that a construction element may be made having a very low weight-volume ratio.

Orifices 23 of block 20 may extend vertically, horizontally, or in both directions through the block, as will be discussed further with particular reference to FIG. 6. By moulding orifices in the block an even greater weight advantage is gained, but it is understood that such orifices need not necessarily be included in any of the construction elements contemplated by the present invention. In addition, the orifices 23 may be variously utilized for such purposes as filling with concrete to provide greater strength and rigidity; for use as conduit or cable runs for purposes such as heating, telephone, electrical power, etc.; or for running tie-down bolts or cable up through a wall structure.

FIG. 6 illustrates another embodiment of the construction element of the present invention. In this instance, the block 60 is particularly contemplated for use as a concrete forming block. Such concrete forming blocks are particularly useful, as discussed above, in the construction of large multiple-story buildings. The blocks thus provide a concrete forming structure in which the concrete may be placed in situ at the construction site, and which further provide a wall having the desired characteristics of colour, finish, etc.

In the particular concrete forming block illustrated in FIG. 6, the block has three orifices 61 extending vertically through the block and one orifice extending horizontally. It will be understood that the exact number and direction of orifices is a matter of design which is dictated by the particular manner in which the concrete forming block is to be utilized. In addition, concrete reinforcing rods 62 are illustrated, which reinforcing rods may be any of the known varieties, and do not constitute any part of the present invention. In the concrete forming block 60, as illustrated, the reinforcing rod 62 may be utilized to compensate for an $L/R$ ratio computed for a concrete core, poured through orifices 61 through several adjacent forming blocks. Adequate reinforcing rods may be introduced into the concrete to provide the structural properties that may be required by the design of the structure in which the concrete forming blocks are utilized.

In FIG. 7, a still further embodiment of a construction element according to the present invention is illustrated. In this instance, the block (in which, for the sake of clarity, a section has been removed from the middle) may be conveniently formed to have an over-all height equal to a standard ceiling height, or any other convenient dimension. In this case, the blocks are contemplated for modular construction methods in which a wall structure for, say, a single story dwelling is built in modular fashion. In this instance, the block is moulded as at 71 for keying on a sill or plate 72. In addition, a further recess 73 is illustrated in the top of the modular element for receiving a ridge board 74. Also, a tie-down bolt 76 is illustrated as passing through one of the orifices 75 for tying the ridge board 74 to the sill or plate 72, thereby providing structural rigidity to a wall building using the modular building block 70. In addition, concrete may be poured through orifices 75; or they may be utilized for cable runs and conduits as discussed above.

In addition to the adhesive bonding between adjacent elements as discussed above, the construction elements of this invention may be conveniently joined together by bolting, use of cables, by snap fitting, by tongue and groove jointing, or by any combination thereof.

When any of the construction elements of the present invention are moulded, additional additives may be included with the foaming formulations to impart fire resistance or combustion retarding properties to the element. Such additive materials include phosphorous and/or halogen containing materials such as tris-β-chloroethyl phosphate; tris-dichloropropyl phosphate; chlorinated biphenyls and polyphenyls; tris-(2,3-dibromopropyl) phosphate; tetrabromobisphenol A; tetrabromophthalic anhydride; pentabromophenol and other phosphate based polyols.

It will be understood that the present invention is not in any way restricted to the particular foaming formulation or the fire retarding additives mentioned herein, but rather that the present invention is directed towards construction elements made of foamable plastic material based polymer systems such as those discussed above by way of illustration and example and more particularly as claimed hereinafter.

I claim:

1. In a wall construction, a plurality of molded construction elements of foamable plastic material based polymer system comprising a hard, integrally formed, smooth skin molded together with said construction elements, and a core of substantially smaller density than that of said integrally formed skin; in which the depth of said skin is from approximately 1/64 to approximately 1/4 inch, the density of said core is from approximately 2 to approximately 4 pounds per cubic foot, the density of said integrally formed smooth skin is from approximately 10 to approximately 60 pounds per cubic foot, and the compressive yield strength of said construction elements is from approximately 100 to approximately 450 p.s.i.; each of said construction elements having at least one orifice molded therein, which extends through said construction element from one major face thereof to the axially opposed major face, said skin completely encasing said core and forming a lining of the orifice with concrete filling said orifice.

2. In a wall construction as claimed in claim 1, each of said molded construction elements being of substantially rectilinear configuration, and having an extension of at least one of the major faces thereof in one direction beyond the limit of a major face and perpendicularly disposed to said extended major face, and a recess in the said one direction of at least one major face axially opposite said extended major face.

3. In the wall construction as claimed in claim 1, each of said construction elements having front and back faces, top and bottom faces and axially opposed end faces, and wherein one of said end faces extends beyond one edge of said front and back faces and the other of said end faces is recessed within the opposite edge of said front and back faces.

4. In a wall construction as claimed in claim 3, each of said construction elements having the top face recessed within the top edge of said front and back faces and the bottom face extending beyond the bottom edge of said front and back faces.

5. In the wall construction as claimed in claim 2, each of said construction elements having at least one pair of opposed edges of said at least one major face thereof extending beyond the limit of a major face perpendicularly disposed thereto and bearing at least a partial chamfer.

6. In a wall construction as claimed in claim 1, said plastic material based polymer system being chosen from the group consisting of urethane, phenolic, epoxy, or styrene polymers.

7. In a wall construction as claimed in claim 1, said plastic material based polymer system being expandable polystyrene beads.

References Cited

UNITED STATES PATENTS

| 1,171,191 | 2/1916 | Gronert | 52—439 |
| 1,785,499 | 12/1930 | Sayers | 52—607 |
| 2,684,589 | 7/1954 | Perreton | 52—439 |
| 2,994,110 | 8/1961 | Hardy. | |
| 3,134,742 | 5/1964 | Wismer. | |
| 3,292,331 | 12/1966 | Sams | 52—439 |

FOREIGN PATENTS

| 143,749 | 6/1920 | Great Britain. |

OTHER REFERENCES

Modern Plastics—May 1954, pp. 103, 105 and 200.

Experimental Plastic Q-4124.2, published by Dow Chemical Co., Plastic Dept., Midland, Mich., June 1957, pp. 1–4 and 12–17.

JOHN E. MURTAGH, *Primary Examiner*.